US011867569B2

(12) United States Patent
Ikeuchi et al.

(10) Patent No.: US 11,867,569 B2
(45) Date of Patent: Jan. 9, 2024

(54) TEMPERATURE ABNORMALITY DETECTION SYSTEM, TEMPERATURE ABNORMALITY DETECTION METHOD, AND COMPUTER-READABLE RECORDING MEDIUM

(71) Applicant: OMRON Corporation, Kyoto (JP)

(72) Inventors: Ryo Ikeuchi, Kumamoto (JP); Takaaki Yamada, Kusatsu (JP); Tatsuaki Kozono, Kusatsu (JP)

(73) Assignee: OMRON CORPORATION, Kyoto (JP)

( * ) Notice: Subject to any disclaimer, the term of this patent is extended or adjusted under 35 U.S.C. 154(b) by 356 days.

(21) Appl. No.: 17/218,883

(22) Filed: Mar. 31, 2021

(65) Prior Publication Data

US 2021/0215546 A1    Jul. 15, 2021

Related U.S. Application Data

(63) Continuation of application No. PCT/JP2019/036450, filed on Sep. 18, 2019.

(30) Foreign Application Priority Data

Oct. 31, 2018 (JP) .................................. 2018-205484

(51) Int. Cl.
*H02H 5/00* (2006.01)
*G01K 3/14* (2006.01)
(Continued)

(52) U.S. Cl.
CPC ............... *G01K 3/14* (2013.01); *G01K 3/005* (2013.01); *H02H 1/0007* (2013.01); *H02H 5/04* (2013.01)

(58) Field of Classification Search
None
See application file for complete search history.

(56) References Cited

U.S. PATENT DOCUMENTS 5,931,580 A * 8/1999 Wyland ................... G01K 7/01
374/166
6,157,897 A    12/2000 Yoshikawa
(Continued)

FOREIGN PATENT DOCUMENTS

EP         0857012 A1    8/1998
EP         3243080 A1    11/2017
(Continued)

OTHER PUBLICATIONS

EPO Extended European Search Report for corresponding EP Application No. 19877922.5; dated Apr. 19, 2022.
(Continued)

*Primary Examiner* — Stephen W Jackson
(74) *Attorney, Agent, or Firm* — CANTOR COLBURN LLP

(57) ABSTRACT

A temperature abnormality detection system of the present invention includes a first temperature sensor that measures a first temperature indicated by a target device and a second temperature sensor that measures a second temperature indicated by ambient air around the target device. A temperature difference between the first temperature and the second temperature is calculated, and when this temperature difference becomes a predetermined threshold value or more, it is determined that a temperature abnormality of the target device has occurred.

11 Claims, 6 Drawing Sheets

(51) Int. Cl.
*G01K 3/00* (2006.01)
*H02H 1/00* (2006.01)
*H02H 5/04* (2006.01)

(56) References Cited

U.S. PATENT DOCUMENTS

| | | | |
|---|---|---|---|
| 9,535,589 B2* | 1/2017 | Fadell | G06F 3/016 |
| 11,098,932 B2* | 8/2021 | Tropea | B63J 2/04 |
| 2018/0010978 A1 | 1/2018 | Bailey | |
| 2018/0313714 A1 | 11/2018 | Bailey | |
| 2019/0128762 A1 | 5/2019 | Bailey et al. | |
| 2022/0167527 A1* | 5/2022 | Chen | G06F 1/206 |
| 2023/0099638 A1* | 3/2023 | Clements | G01K 17/00 |
| | | | 374/126 |

FOREIGN PATENT DOCUMENTS

| | | |
|---|---|---|
| JP | S62211997 A | 9/1987 |
| JP | 2009067521 A | 4/2009 |
| JP | 2012181859 A | 9/2012 |
| JP | 2016130699 A | 7/2016 |
| WO | 2016110696 A1 | 7/2016 |

OTHER PUBLICATIONS

International Search Report for International Application No. PCT/JP2019/036450; dated Nov. 12, 2019.
PCT Written Opinion of the International Searching Authority for International Application No. PCT/JP2019/036450; dated Nov. 12, 2019.
JPO Notice of Reasons for Refusal for corresponding JP Application No. 2018-205484; dated Jan. 18, 2022.

* cited by examiner

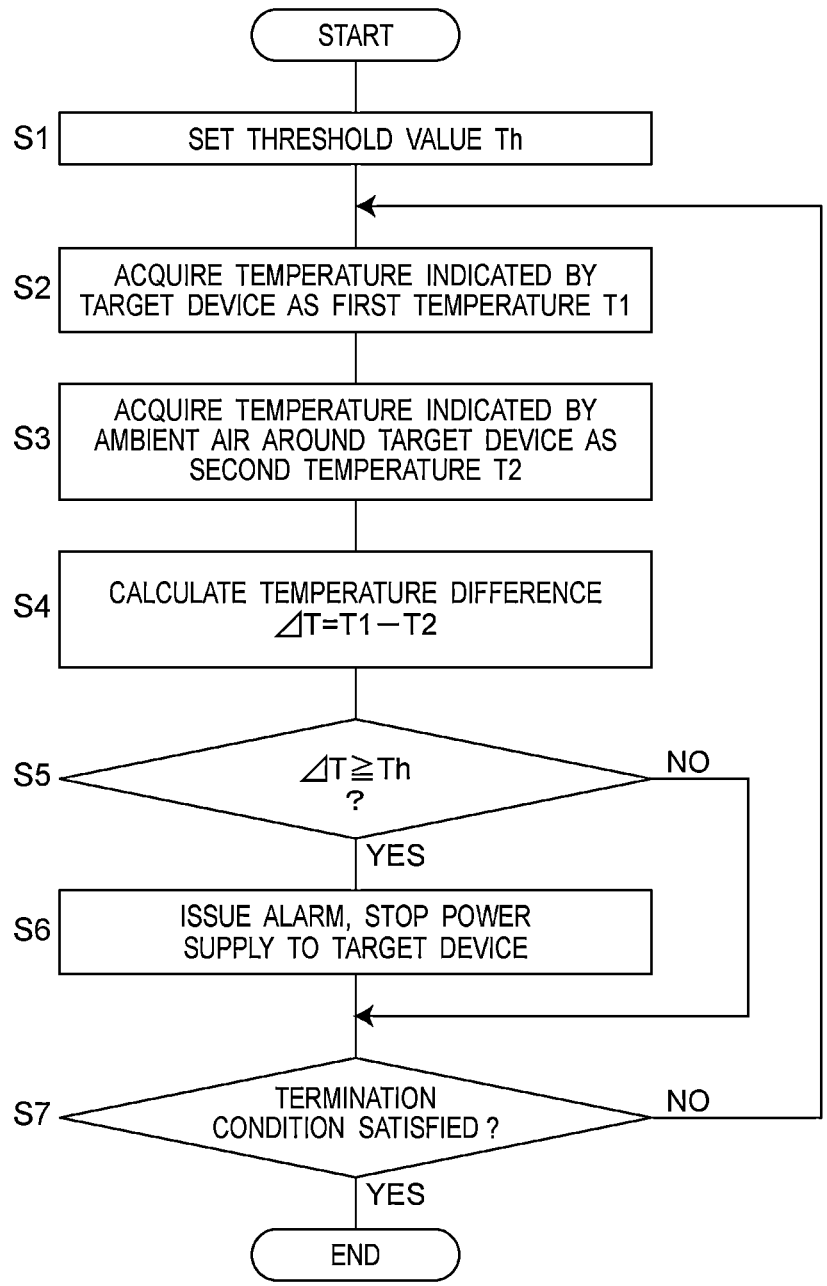

PRESENT INVENTION

NORMAL STATE

TEMPERATURE ABNORMAL STATE

CONVENTIONAL EXAMPLE

NORMAL STATE

TEMPERATURE ABNORMAL STATE

TEMPERATURE ABNORMALITY DETECTION SYSTEM, TEMPERATURE ABNORMALITY DETECTION METHOD, AND COMPUTER-READABLE RECORDING MEDIUM

CROSS-REFERENCE TO PRIOR APPLICATIONS

This application is a continuation under 35 U.S.C. § 120 of PCT/JP2019/036450, filed Sep. 18, 2019, which is incorporated herein reference and which claimed priority to Japanese Application No. 2018-205484, filed Oct. 31, 2018. The present application likewise claims priority under 35 U.S.C. § 119 to Japanese Application No. 2018-205484, filed Oct. 31, 2018, the entire content of which is also incorporated herein by reference.

TECHNICAL FIELD

The present invention relates to a temperature abnormality detection system and a temperature abnormality detection method, and more particularly to a temperature abnormality detection system and a temperature abnormality detection method for detecting a temperature abnormality of a target device installed in various boards. The present invention also relates to a computer-readable recording medium storing a program for causing a computer to execute such a temperature abnormality detection method.

BACKGROUND ART

Conventionally, for example, as this kind of temperature abnormality detection system, an elevator control device disclosed in Patent Document 1 (JP 2009-067521 A) is known. In this device, a control board for controlling operation of an elevator includes first temperature detecting means that detects a temperature of a device (equipment) forming a first control power supply and generates a first detection signal when the detected temperature exceeds a predetermined first threshold value (temperature upper limit value). In this control device, a first opening/closing means (supplying DC voltage to the first control power supply) is opened based on the first detection signal, thereby enabling early detection of a fire in the control board.

SUMMARY OF THE INVENTION

By the way, as shown in FIG. 6A, when the device in the control board operates normally, temperatures increase with passage of time from operation start temperatures Ts0 and Tw0 in summer and winter, respectively (here, Ts0>Tw0 as temperatures by seasons). When a certain period of time (for example, about 30 minutes to 1 hour) passes, the temperatures reach saturation temperatures Ts1 and Tw1, with temperature increase amounts ΔTsinc and ΔTwinc becoming constant, respectively. Therefore, in technique of above conventional example, a first threshold value (temperature upper limit value) Tu1 is set to a temperature slightly exceeding the saturation temperature Ts1 in summer (for example, 80° C.) so as not to make false determinations in summer. Here, as shown in FIG. 6B, when the device in the control board generates abnormal heat (temperature abnormal state), the temperatures increase with passage of time from the operation start temperatures Ts0 and Tw0 in summer and winter, with larger heat generation than the temperature increase amounts at normal state ΔTsinc and ΔTwinc, respectively (Temperature increase amounts at the temperature abnormal state are represented by ΔTsinc' and ΔTwinc'. Here, ΔTsinc<Tsinc' and ΔTwinc<ΔTwinc'.). The temperatures reach higher temperatures Ts1' and Tw1' than those in the normal state, respectively. In the technique of the conventional example, when the temperature is abnormal in summer, the temperature Ts1' exceeds the temperature upper limit value Tu1, so that the abnormality can be detected. However, when the temperature is abnormal in winter, a situation occurs in which the temperature Tw1' does not exceed the temperature upper limit value Tu1, and there arises a problem that the abnormality cannot be detected.

Therefore, an object of the present invention is to provide a temperature abnormality detection system and a temperature abnormality detection method that can accurately detect a temperature abnormality of a target device installed in a board, regardless of the temperature of environment where the board is placed (for example, temperature by season). Further, an object of the present invention is to provide a computer-readable recording medium storing a program for causing a computer to execute such a temperature abnormality detection method.

In order to achieve the above object, a temperature abnormality detection system according to the present disclosure is a temperature abnormality detection system that detects a temperature abnormality of a target device installed in a board; the temperature abnormality detection system comprising:
 a first temperature sensor that measures a first temperature indicated by the target device;
 a second temperature sensor that measures a second temperature indicated by ambient air around the target device; and
 an abnormality determination unit that calculates a temperature difference between the first temperature and the second temperature, and determines that a temperature abnormality of the target device has occurred when the temperature difference becomes a predetermined threshold value or more.

In another aspect, a temperature abnormality detection method according to the present disclosure is a temperature abnormality detection method that detects a temperature abnormality of a target device installed in a board, the temperature abnormality detection method comprising:
 measuring a first temperature indicated by the target device by a first temperature sensor, and measuring a second temperature indicated by ambient air around the target device by a second temperature sensor; and
 calculating a difference between the first temperature and the second temperature, and determining that a temperature abnormality of the target device has occurred when the difference becomes a predetermined threshold value or more.

In yet another aspect, a computer-readable recording medium storing a program according to the present disclosure is a computer-readable recording medium non-transitorily storing a program for causing a computer to execute the above temperature abnormality detection method.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 is a flowchart showing an operation flow of temperature abnormality detection executed by the temperature abnormality detection system.

DESCRIPTION OF EMBODIMENT

Hereinafter, an embodiment of the present invention will be described in detail with reference to the drawings.

(System Configuration)

Figure 1A:
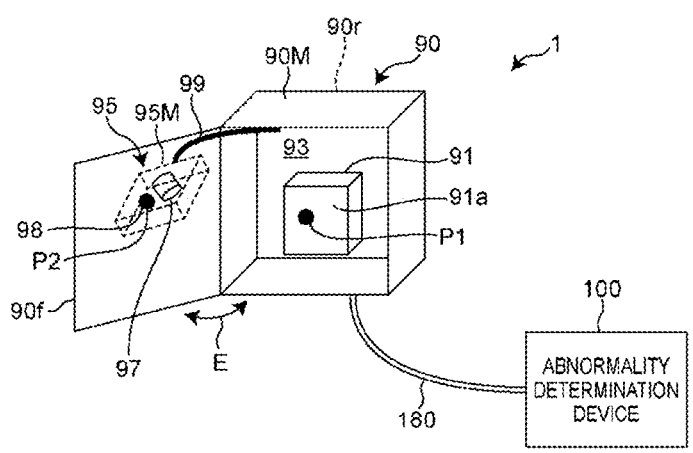
FIG. 1A is a diagram showing a schematic configuration of a temperature abnormality detection system according to an embodiment of the present invention.

FIG. 1A schematically shows a schematic configuration of a temperature abnormality detection system 1 according to an embodiment of the present invention. In this example, the temperature abnormality detection system 1 detects a temperature abnormality of a target device 91 installed in a control board 90 as an example of a board, and roughly includes a sensor device 95 installed inside of a front door 90f of the control board 90 and an abnormality determination device 100 installed outside the control board 90. In this example, the sensor device 95 in the control board 90 and the abnormality determination device 100 are communicably connected via signal cables 99 and 180. Note that the sensor device 95 and the abnormality determination device 100 may be able to communicate with each other via wireless communication.

Figure 1B:
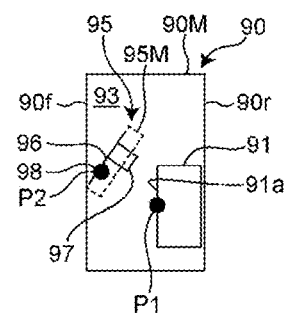
FIG. 1B is a diagram schematically showing arrangement of a target device to be a target of temperature abnormality detection and a sensor casing, which are provided in a control board in FIG. 1A with a front door of the control board closed.

The control board 90 has a general configuration. In this example, it includes a casing 90M having a rectangular parallelepiped outer shape, the target device 91 installed in this casing 90M, and a power supply unit 92 (see FIG. 3 described later) that supplies power to this target device 91. In this example, the casing 90M has the front door 90f that can be opened and closed as shown by an arrow E in FIG. 1A. As shown in FIG. 1B (schematically showing the inside of the control board 90 viewed from a right side with the front door 90f closed), the target device 91 is attached along an inner surface of a rear wall 90r of the casing 90M.

In addition to various devices such as a DC power supply, a contactor, a controller, a motor driver, and a breaker, examples of the target device 91 include those having a possibility of a temperature increase during operation, such as a power semiconductor, a relay, a heat sink, power system wiring, a terminal, etc. that form a part of the devices.

The sensor device 95 includes a sensor casing 95M having a flat rectangular parallelepiped outer shape, a radiation temperature sensor 97 forming a first temperature sensor mounted on the sensor casing 95M, and a resistance temperature detector 98 as an example of a contact type temperature sensor and forming a second temperature sensor housed in the sensor casing 95M. Note that the second temperature sensor may be a contact type temperature sensor of another type, such as a thermistor, a thermocouple, or an IC temperature sensor, instead of the resistance temperature detector 98.

Figure 2A:
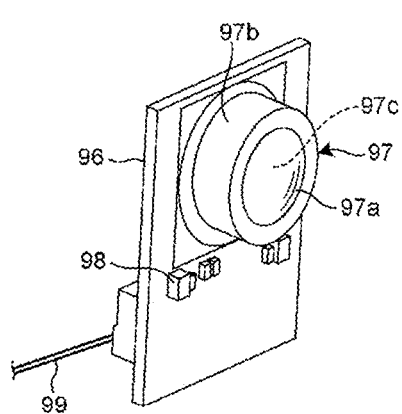
FIG. 2A is a diagram showing appearance of a sensor array module mounted on the sensor casing.
Figure 2B:
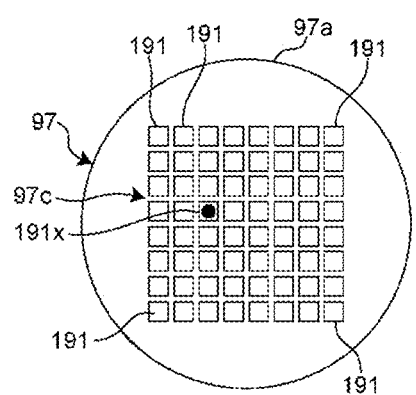
FIG. 2B is a diagram showing a temperature sensitive element array of a radiation temperature sensor forming a first temperature sensor included in the sensor array module.

As shown in FIG. 2A, in this example, the radiation temperature sensor 97 includes a cylindrical can case 97b mounted on a sensor substrate 96, a lens 97a attached so as to close a tip opening of this can case 97b, and a temperature sensitive element array 97c arranged along the sensor substrate 96 in the can case 97b. The lens 97a collects infrared rays emitted by the target device 91 and makes them incident on the temperature sensitive element array 97c. In this example, the temperature sensitive element array 97c is composed of a thermopile (thermoelectric pile), and is configured by an array of temperature sensitive elements 191, 191, . . . in 8 rows×8 columns as shown in FIG. 2B. By looking through the lens 97a in different directions in a field of view of the radiation temperature sensor 97, these temperature sensitive elements 191, 191, . . . can output multiple (64 in this example) temperature signals that represent temperature distribution in the field of view. As will be described later, a temperature represented by a selected signal among these 64 temperature signals is acquired as a first temperature T1.

In this way, when the first temperature sensor includes the radiation temperature sensor 97, the first temperature T1 indicated by the target device 91 can be measured by the radiation temperature sensor 97 at a position in the casing 90M of the control board 90 and away from the target device 91. Therefore, even if the temperature of the target device 91 increases abnormally, the radiation temperature sensor is unlikely to be damaged by temperature increase. Further, the radiation temperature sensor 97 itself has an advantage that there is less risk of a short circuit, ignition, etc. than, for example, a thermocouple temperature sensor.

As shown in FIG. 2A, the resistance temperature detector 98 is mounted on the sensor substrate 96 together with the radiation temperature sensor 97 described above. The resistance temperature detector 98 comes into contact with ambient air at a position where the resistance temperature detector 98 is mounted, and outputs a temperature signal (second temperature T2) that indicates a temperature of the ambient air, due to a resistance change of its resistor caused by a temperature change.

As the sensor substrate 96 in which the radiation temperature sensor 97 and the resistance temperature detector 98 are mounted in common in this way, a commercially available product, for example, a thermopile array sensor (module type) manufactured by SSC Co., Ltd. can be used. As a result, the radiation temperature sensor 97 and the resistance temperature detector 98 can be compactly configured.

As shown in FIG. 1B, the sensor substrate 96, on which the radiation temperature sensor 97 and the resistance temperature detector 98 are mounted, is mounted on the sensor casing 95M described above in a state in which the lens 97a of the radiation temperature sensor 97 faces the outside. The sensor casing 95M is firmly attached to an inner surface of the front door 90f of the control board 90 by a mounting bracket (not shown). In this example, the sensor casing 95M (and the sensor substrate 96) is mounted to the vertical inner surface of the front door 90f in a tilted state so that the target device 91 is in the field of view of the radiation temperature sensor 97.

As a result, a position P2 where the second temperature T2 is measured by the resistance temperature detector 98 is located in the casing 90M of the control board 90 and away from the target device 91. It can be said that the second temperature T2 measured by the resistance temperature detector 98 is substantially equal to temperature indicated by ambient air 93 around the target device 91.

Note that, in this example, the radiation temperature sensor 97 and the resistance temperature detector 98 are configured to operate by power supplied from a battery (not shown) mounted on the sensor casing 95M. However, the radiation temperature sensor 97 and the resistance temperature detector 98 may receive power supply from the power supply unit 92 of the control board 90.

Figure 3:
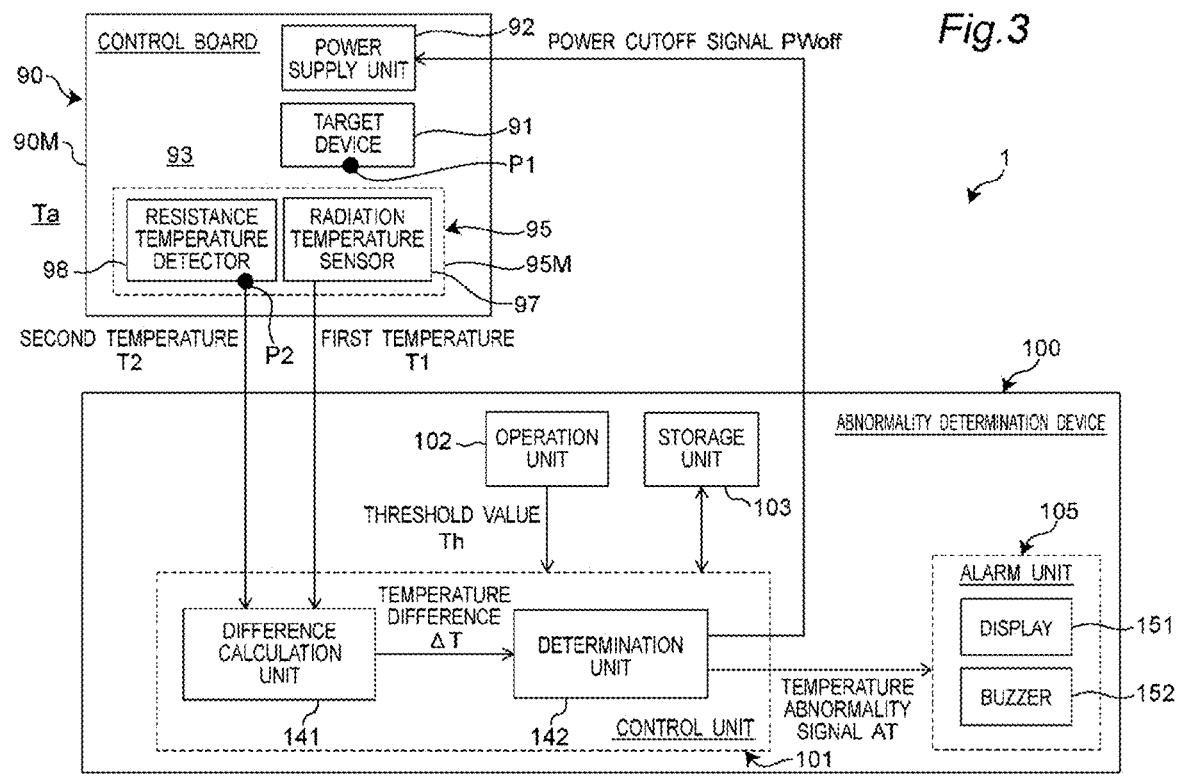
FIG. 3 is a diagram showing a functional block configuration of the temperature abnormality detection system.

FIG. 3 shows a functional block configuration of the temperature abnormality detection system 1.

In this example, the abnormality determination device 100 included in the temperature abnormality detection system 1 is provided with an operation unit 102, a storage unit 103, a control unit 101, and an alarm unit 105.

The operation unit 102 includes a keyboard and a mouse in this example. In this example, the operation unit 102 is particularly used for a user to input a processing start/end instruction and a threshold value Th for determining a temperature abnormality.

In this example, the storage unit 103 includes an EEPROM (Electrically Erasable Programmable Read-Only Memory) capable of storing data non-temporarily and a RAM (Random Access Memory) capable of temporarily storing data. Software (computer program) for controlling the control unit 101 is stored in this storage unit 103. Further, in this example, the storage unit 103 stores the threshold value Th for determining the temperature abnormality input by the user.

In this example, the control unit 101 includes a CPU (Central Processing Unit) as a processor that operates according to the control program (software) stored in the storage unit 103. This control unit 101 includes a difference calculation unit 141 and a determination unit 142, both of which are configured by the software. The difference calculation unit 141 and the determination unit 142 constitute an abnormality determination unit. The operation of this control unit 101 will be described in detail later using an operation flow of FIG. 4.

In this example, the alarm unit 105 includes a display 151 made of an LCD (Liquid Crystal Display) and a buzzer 152. The display 151 displays various information on a display screen based on a signal from the control unit 101. The buzzer 152 issues a buzzer sound based on the signal from the control unit 101.

(Operation of Temperature Abnormality Detection)

FIG. 4 shows a flow of temperature abnormality detection processing (a temperature abnormality detection method) executed by the abnormality determination device 100. In this example, at the same time as operation of the control board 90 is started, the abnormality determination device 100 receives a processing start instruction via the operation unit 102 shown in FIG. 3 and starts this temperature abnormality detection processing. The temperature of the environment where the control board 90 is placed is Ta (see FIG. 3).

First, as shown in step S1 of FIG. 4, a user inputs a threshold value Th for determining a temperature abnormality via the operation unit 102 in this example. In this example, the threshold value Th=20° C. The threshold value Th input by the user is stored in the storage unit 103 shown in FIG. 3.

Next, as shown in steps S2 and S3 of FIG. 4, the control unit 101 inputs a temperature signal (first temperature T1) output by the radiation temperature sensor 97 and a temperature signal (second temperature T2) output by the resistance temperature detector 98 via an input/output interface (not shown).

In this example, the temperature signal output by the radiation temperature sensor 97 includes a total of 64 signals by the temperature sensitive elements 191, 191, . . . in 8 rows×8 columns shown in FIG. 2B. The control unit 101 selects a signal representing the highest temperature among those signals (that is, temperature of a portion P1 indicating the largest temperature increase on a surface 91a of the target device 91), and acquires the temperature represented by the signal as the first temperature T1. This is because the portion P1 indicating the largest temperature increase on the surface 91a of the target device 91 is a portion that requires the most attention. Specifically, for example, it is assumed that among the temperature sensitive elements 191, 191, . . . in 8 rows×8 columns shown in FIG. 2B, output of a certain temperature sensitive element 191x represents the highest temperature. In that case, the control unit 101 selects a signal output by the temperature sensitive element 191x, and acquires the temperature represented by the signal as the first temperature T1.

As described with reference to FIG. 1B, the temperature signal (second temperature T2) output by the resistance temperature detector 98 is the temperature indicated by the ambient air 93 around the target device 91 at the position in the casing 90M of the control board 90 and away from the target device 91.

Next, as shown in step S4 of FIG. 4, the control unit 101 acts as the difference calculation unit 141 and calculates a temperature difference ΔT between the first temperature T1 and the second temperature T2. Here, ΔT=T1−T2. Note that at the start of operation, T1≈Ta and T2≈Ta, so ΔT≈0.

Next, as shown in step S5 of FIG. 4, the control unit 101 acts as the determination unit 142 and determines whether or not the temperature difference ΔT becomes the threshold value Th or more. Here, if the temperature difference ΔT is less than the threshold value Th (NO in step S5), the control unit 101 (determination unit 142) determines that the temperature abnormality of the target device 91 has not occurred. Unless a termination condition for terminating this temperature abnormality detection processing is satisfied (NO in step S7), the process returns to step S2 and is repeated.

On the other hand, if the temperature difference ΔT becomes the threshold value Th or more (YES in step S5), the control unit 101 (determination unit 142) determines that the temperature abnormality of the target device 91 has occurred. Then, the process proceeds to step S6. When determining that this temperature abnormality has occurred, the control unit 101 creates a temperature abnormality signal ΔT indicating that the temperature abnormality has occurred, and outputs it to the alarm unit 105 shown in FIG. 3. As a result, the display 151 included in the alarm unit 105 displays an alarm indicating that a temperature abnormality of the target device 91 has occurred (for example, "a temperature abnormality has occurred in the target device 91") on the display screen. In addition, the buzzer 152 issues a buzzer sound as an alarm. Therefore, the user can immediately recognize that the temperature abnormality has occurred in the target device 91 installed in the control board 90 by these alarms, and can promptly take necessary measures such as replacing the target device 91.

Further, when determining that the above temperature abnormality has occurred, the control unit 101 acts as the abnormality determination unit, creates a power cutoff signal PWoff indicating that power supply to the target device 91 is cut off, and outputs it to the power supply unit 92 of the control board 90. In this example, when receiving the power cutoff signal PWoff, the power supply unit 92 of the control board 90 automatically and immediately cuts off the power supply to the target device 91. Therefore, it is possible to prevent a fire in the control board 90 from occurring by avoiding a further temperature increase of the target device 91.

Note that, instead of automatically and immediately cutting off the power supply to the target device 91, the control unit 101 may display, for example, "please cut off power supply to the target device 91" on the display screen of the display 151. Upon seeing this display, the user can manually cut off the power supply to the target device 91.

After that, in step S7 of FIG. 4, the control unit 101 determines whether or not the termination condition for terminating this temperature abnormality detection processing is satisfied. In this example, when a predetermined processing period elapses from the start of this temperature abnormality detection processing or when a processing end instruction is received via the operation unit 102, the control unit 101 determines that the termination condition is satisfied, and terminates this temperature abnormality detection processing.

(Effects)

As described above, this temperature abnormality detection system 1 detects a temperature abnormality of the target device 91 based on whether or not the temperature difference $\Delta T$ ($=T1-T2$) between the first temperature T1 and the second temperature T2 becomes the threshold value Th or more. Here, since the second temperature T2 is the temperature indicated by the ambient air 93 around the target device 91, it reflects the temperature Ta of the environment where the control board 90 is placed (for example, temperature by season). Therefore, by determining whether or not a temperature abnormality has occurred based on the temperature difference $\Delta T$, influence of the temperature Ta of the environment on a determination result is offset. Therefore, according to this temperature abnormality detection system 1, the temperature abnormality of the target device 91 installed in the control board 90 can be accurately detected regardless of the temperature Ta of the environment where the control board 90 is placed.

Figure 5A:
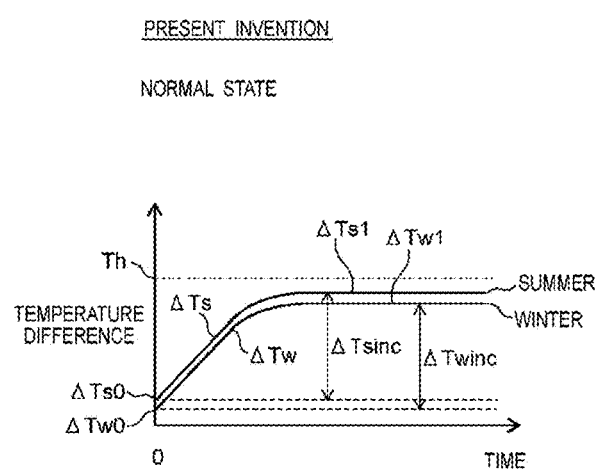
FIG. 5A and FIG. 5B are graphs for explaining an effect of the temperature abnormality detection system.
Figure 5B:
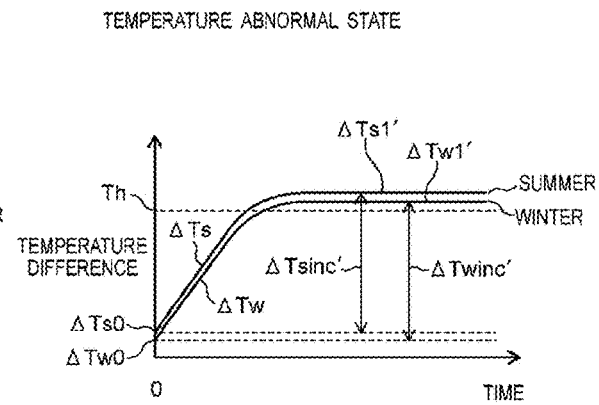
Figure 6A:
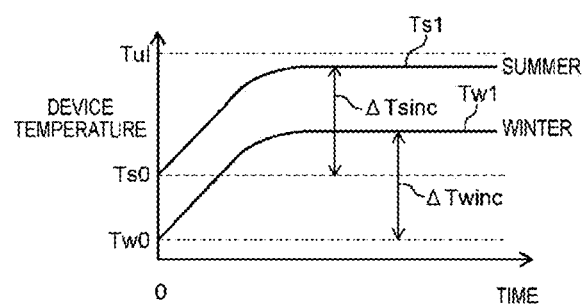
FIG. 6A and FIG. 6B are graphs for explaining a problem according to a conventional example.
Figure 6B:
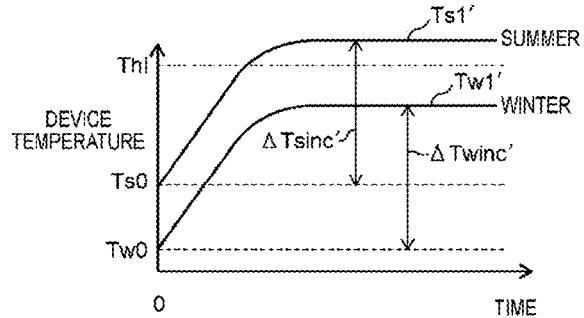

For example, the temperature difference $\Delta T$ between the first temperature T1 and the second temperature T2 at the start of operation in summer and winter is expressed as $\Delta Ts0$ and $\Delta Tw0$, respectively. At the start of operation, $\Delta Ts0 \approx 0$ and $\Delta Tw0 \approx 0$. As shown in FIG. 5A, when the target device 91 in the control board 90 operates normally, the temperature differences increase with passage of time from the temperature differences $\Delta Ts0$ and $\Delta Tw0$ at the start of operation in summer and winter, respectively. When a certain period of time (for example, about 30 minutes to 1 hour) passes, the temperature differences reach saturation temperature differences $\Delta Ts1$ and $\Delta Tw1$, with temperature increase amounts $\Delta Tsinc$ and $\Delta Twinc$ becoming constant, respectively. In this example, the threshold value is empirically set to the above-mentioned 20° C. so as not to be exceeded by these saturation temperature differences $\Delta Ts1$ and $\Delta Tw1$. Therefore, when the target device 91 operates normally, the abnormality determination device 100 does not erroneously determine that a temperature abnormality of the target device 91 has occurred. In addition, as shown in FIG. 5B, when the device in the control board 90 generates abnormal heat (temperature abnormal state), the temperature differences increase with passage of time from the temperature differences at the start of operation $\Delta Ts0$ and $\Delta Tw0$ in summer and winter, respectively. Heat generation is larger than the temperature increase amounts at normal state $\Delta Tsinc$ and $\Delta Twinc$. (Temperature increase amounts at the temperature abnormal state are represented by $\Delta Tsinc'$ and $\Delta Twinc'$. Here, $\Delta Tsinc < \Delta Tsinc'$ and $\Delta Twinc < \Delta Twinc'$.) The temperature differences reach $\Delta Ts1'$ and $\Delta Tw1'$, respectively, higher than those in the normal state. As a result, $\Delta Ts1' > Th$ and $\Delta Tw1' > Th$. Therefore, the abnormality determination device 100 can accurately detect the temperature abnormality of the target device 91 in both the summer and the winter.

As described above, according to the temperature abnormality detection system 1, the temperature abnormality of the target device 91 installed in the control board 90 can be accurately detected regardless of the temperature Ta of the environment where the control board 90 is placed.

In particular, in the above example, the position P2 where the second temperature T2 is measured by the resistance temperature detector 98 is located in the casing 90M of the control board 90 and away from the target device 91. Therefore, the second temperature T2 becomes the temperature indicated by the ambient air 93 around the target device 91 in the casing of the control board 90, and is less susceptible to a temperature increase of the target device 91. Moreover, since the resistance temperature detector 98 is housed in the sensor casing 95M, it is shielded from infrared rays emitted by the target device 91. Therefore, the second temperature T2 is still less susceptible to the temperature increase of the target device 91. Therefore, the temperature difference $\Delta T$ between the first temperature T1 and the second temperature T2 is a net temperature increase amount of the target device 91 with respect to the ambient air 93 around the target device 91. As a result, accuracy of determining the temperature abnormality is improved.

Further, in the above example, the abnormality determination device 100 acquires the temperature of the portion P1 indicating the largest temperature increase on the surface 91a of the target device 91, that is, the temperature of the portion requiring the most attention, as the first temperature T1. As a result, when the temperature increase varies on the surface 91a of the target device 91, the temperature abnormality is determined based on the temperature increase amount of the portion P1 requiring the most attention. With this configuration, it is possible to effectively prevent occurrence of a fire in the control board 90.

The above-mentioned temperature abnormality detection method may be recorded as software (computer program) on a recording medium that can store data in a non-transitory manner, such as a compact disc (CD), a digital versatile disc (DVD), or a non-volatile memory. By installing the software recorded on such a recording medium on practical computer devices such as a programmable logic controller (PLC), a personal computer, a personal digital assistant (PDA), and a smartphone, the temperature abnormality detection method by the above-mentioned abnormality determination device 100 can be executed by these computers.

Further, in the above example, the abnormality determination device 100 is installed outside the control board 90, but the present invention is not limited to this. For example, the abnormality determination device 100 may be incorporated in the sensor casing 95M installed inside the control board 90. In that case, it is desirable that the abnormality determination device 100 is provided with a communication unit capable of wireless communication, and when a temperature abnormality of the target device 91 occurs, the communication unit transmits an alarm to the outside. By receiving the alarm, a user can immediately recognize that the temperature abnormality has occurred in the target device 91 installed in the control board 90, and can promptly take necessary measures such as replacing the target device 91.

Further, in the above example, it is assumed that the target device 91 is installed in the control board 90, but the present invention is not limited to this. The target device 91 may be installed in various boards other than the control board 90, such as a switchboard or a distribution board. Even in such a case, the present invention is preferably applicable.

Further, in the above-described embodiment, the control unit 101 includes the CPU, but the present invention is not limited to this. The control unit 101 may include a logic circuit (integrated circuit) such as a PLD (Programmable Logic Device) or an FPGA (Field Programmable Gate Array).

As described above, a temperature abnormality detection system according to the present disclosure is a temperature abnormality detection system that detects a temperature abnormality of a target device installed in a board; the temperature abnormality detection system comprising:

a first temperature sensor that measures a first temperature indicated by the target device;

a second temperature sensor that measures a second temperature indicated by ambient air around the target device; and an abnormality determination unit that calculates a temperature difference between the first temperature and the second temperature, and determines that a temperature abnormality of the target device has occurred when the temperature difference becomes a predetermined threshold value or more.

In the present specification, the "target device" refers to a device that is a target of temperature measurement and may have a temperature increase during operation. Further, the "board" includes various boards such as a switchboard, a control board, and a distribution board.

In the temperature abnormality detection system of the present disclosure, the first temperature sensor measures the first temperature indicated by the target device installed in the board. The second temperature sensor measures the second temperature indicated by the ambient air around the target device. The abnormality determination unit calculates the temperature difference between the first temperature and the second temperature, and determines that the temperature abnormality of the target device has occurred when the temperature difference becomes the predetermined threshold value or more. Here, since the second temperature is the temperature indicated by the ambient air around the target device, it reflects the temperature of environment where the board is placed (for example, temperature by season). Therefore, by determining whether or not the temperature abnormality has occurred based on the temperature difference between the first temperature and the second temperature, influence of the temperature of the environment on a determination result is offset. Therefore, according to the temperature abnormality detection system of the present disclosure, it is possible to accurately detect the temperature abnormality of the target device installed in the board regardless of the temperature of the environment where the board is placed.

In the temperature abnormality detection system of one embodiment, a position where the second temperature is measured is a position inside a casing of the board.

In the temperature abnormality detection system of this one embodiment, the second temperature is a temperature indicated by the ambient air around the target device in the casing of the board. Therefore, the temperature difference between the first temperature and the second temperature is a net temperature increase amount of the target device with respect to the ambient air around the target device. In response to this, when the temperature difference between the first temperature and the second temperature, that is, the net temperature increase amount of the target device becomes the predetermined threshold value or more, the abnormality determination unit determines that the temperature abnormality of the target device has occurred. Therefore, accuracy of determining the temperature abnormality is improved.

In the temperature abnormality detection system of one embodiment, the position where the second temperature is measured is a position away from the target device.

In the temperature abnormality detection system of this one embodiment, the second temperature is a temperature at the position in the casing of the board and away from the target device. Therefore, the second temperature is less likely to be affected by the temperature increase of the target device. Therefore, the accuracy of determining the temperature abnormality is further improved.

In the temperature abnormality detection system of one embodiment, the first temperature sensor acquires, as the first temperature, a temperature of a portion indicating a largest temperature increase on a surface of the target device.

In the temperature abnormality detection system of this one embodiment, the first temperature sensor acquires, as the first temperature, the temperature of the portion indicating the largest temperature increase on the surface of the target device. Therefore, the temperature difference between the first temperature and the second temperature is a temperature increase amount of the portion requiring the most attention on the surface of the target device with respect to the ambient air around the target device. In response to this, when the temperature difference between the first temperature and the second temperature, that is, the temperature increase amount of the portion requiring the most attention on the surface of the target device becomes the predetermined threshold value or more, the abnormality determination unit determines that the temperature abnormality of the target device has occurred. As a result, when the temperature increase varies on the surface of the target device, the temperature abnormality is determined based on the temperature increase amount of the portion requiring the most attention. With this configuration, it is possible to effectively prevent occurrence of a fire in the board.

In the temperature abnormality detection system of one embodiment, the first temperature sensor includes a radiation temperature sensor installed in a casing of the board.

In the present specification, the "radiation temperature sensor" refers to a type of temperature sensor that measures temperature by detecting infrared radiation emitted by the target device.

In the temperature abnormality detection system of this one embodiment, the radiation temperature sensor included in the first temperature sensor can measure the first temperature indicated by the target device at a position in the casing of the board and away from the target device. Therefore, even if the temperature of the target device increases abnormally, it is unlikely to be damaged by the temperature increase. Further, the radiation temperature sensor itself has an advantage that there is less risk of a short circuit, ignition, etc. than, for example, a thermocouple temperature sensor.

In the temperature abnormality detection system of one embodiment, the radiation temperature sensor is mounted on a sensor casing installed in the casing of the board, and the second temperature sensor includes a contact type temperature sensor housed in the sensor casing.

In the present specification, the "contact type temperature sensor", such as a resistance temperature detector, a thermistor, a thermocouple, and an IC (Integrated Circuit) temperature sensor, means a type of temperature sensor that measures a temperature of an object (here, ambient air) to be measured by the temperature sensor coming into contact with the object.

In the temperature abnormality detection system of this one embodiment, since the contact type temperature sensor included in the second temperature sensor is housed in the sensor casing, it is shielded from infrared rays emitted by the target device. Therefore, the second temperature is still less affected by the temperature increase of the target device, and the accuracy of determining the temperature abnormality is further improved. Since the radiation temperature sensor is mounted on the sensor casing installed in the casing of the board, it can be firmly attached to an inner wall of the casing of the board, for example, via the sensor casing. Further, as the radiation temperature sensor and the contact type temperature sensor, for example, a commercially available product of a type mounted on a common sensor substrate can be used. Therefore, the first temperature sensor and the second temperature sensor can be compactly configured.

The temperature abnormality detection system of one embodiment further comprises an alarm unit that issues an alarm when it is determined that the temperature abnormality has occurred.

In the temperature abnormality detection system of this one embodiment, when it is determined that the temperature abnormality has occurred, the alarm unit issues an alarm. Therefore, a user can immediately recognize that the temperature abnormality has occurred in the target device installed in the board by this alarm, and can quickly take necessary measures such as replacing the target device.

In the temperature abnormality detection system of one embodiment, when it is determined that the temperature abnormality has occurred, the abnormality determination unit outputs a power cutoff signal for cutting off power supply to the target device.

In the temperature abnormality detection system of this one embodiment, when it is determined that the temperature abnormality has occurred, the abnormality determination unit outputs the power cutoff signal for cutting off the power supply to the target device. Therefore, by cutting off the power supply to the target device in response to this power cutoff signal, it is possible to avoid a further temperature increase of the target device and prevent occurrence of a fire in the board.

In another aspect, a temperature abnormality detection method according to the present disclosure is a temperature abnormality detection method that detects a temperature abnormality of a target device installed in a board, the temperature abnormality detection method comprising:

measuring a first temperature indicated by the target device by a first temperature sensor, and measuring a second temperature indicated by ambient air around the target device by a second temperature sensor; and calculating a difference between the first temperature and the second temperature, and determining that a temperature abnormality of the target device has occurred when the difference becomes a predetermined threshold value or more.

According to the temperature abnormality detection method of the present disclosure, it is possible to accurately detect the temperature abnormality of the target device installed in the board regardless of temperature of environment where the board is placed.

In yet another aspect, a computer-readable recording medium storing a program according to the present disclosure is a computer-readable recording medium non-transitorily storing a program for causing a computer to execute the above temperature abnormality detection method.

By making a computer read the program stored in the computer-readable recording medium according to the present disclosure and causing the computer to execute the program, the temperature abnormality detection method can be implemented.

As is clear from the above, according to the temperature abnormality detection system and the temperature abnormality detection method of the present disclosure, the temperature abnormality of the target device installed in the board can be accurately detected regardless of the temperature of the environment where the board is placed. Further, by making a computer read the program stored in the computer-readable recording medium according to the present disclosure and causing the computer to execute the program, the temperature abnormality detection method can be implemented.

The above embodiments are illustrative, and various modifications can be made without departing from the scope of the present invention. Each of the above embodiments can be implemented independently, but combinations of the embodiments are also possible. In addition, various features in different embodiments can also be independently implemented, but combinations of features in different embodiments are also possible.

The invention claimed is:

1. A temperature abnormality detection system that detects a temperature abnormality of a target device installed in a board casing of a board; the temperature abnormality detection system comprising:

a first temperature sensor that includes a radiation temperature sensor installed in the board casing and measures a first temperature indicated by the target device by the radiation temperature sensor;

a second temperature sensor that measures a second temperature indicated by ambient air around the target device; and an abnormality determination unit that calculates a temperature difference between the first temperature and the second temperature, and determines that a temperature abnormality of the target device has occurred when the temperature difference becomes a predetermined threshold value or more.

2. The temperature abnormality detection system according to claim 1, wherein a position where the second temperature is measured is a position inside the board casing.

3. The temperature abnormality detection system according to claim 2, wherein the position where the second temperature is measured is a position away from the target device.

4. The temperature abnormality detection system according to claim 1, wherein the first temperature sensor acquires, as the first temperature, a temperature of a portion indicating a largest temperature increase on a surface of the target device.

5. The temperature abnormality detection system according to claim 1, wherein
the radiation temperature sensor is mounted on a sensor casing installed in the board casing, and
the second temperature sensor includes a contact type temperature sensor housed in the sensor casing.

6. The temperature abnormality detection system according to claim 1, further comprising
an alarm unit that issues an alarm when it is determined that the temperature abnormality has occurred.

7. The temperature abnormality detection system according to claim 1, wherein
when it is determined that the temperature abnormality has occurred, the abnormality determination unit outputs a power cutoff signal for cutting off power supply to the target device.

8. A temperature abnormality detection method performed by the temperature abnormality detection system according to claim 1, for detecting the temperature abnormality of the target device installed in the board casing, the temperature abnormality detection method comprising:
measuring the first temperature indicated by the target device by the radiation temperature sensor of the first temperature sensor, and measuring the second temperature indicated by the ambient air around the target device by the second temperature sensor; and
calculating, by the abnormality determination unit, the temperature difference between the first temperature and the second temperature, and determining that the temperature abnormality of the target device has occurred when the temperature difference becomes the threshold value or more.

9. A non-transitory computer-readable recording medium storing a program for causing a computer to execute the temperature abnormality detection method according to claim 8.

10. A temperature abnormality detection system that detects a temperature abnormality of a target device installed in a board; the temperature abnormality detection system comprising:
a first temperature sensor that measures a first temperature indicated by the target device;
a second temperature sensor that measures a second temperature indicated by ambient air around the target device; and
an abnormality determination unit that calculates a temperature difference between the first temperature and the second temperature, and determines that a temperature abnormality of the target device has occurred when the temperature difference becomes a predetermined threshold value or more, wherein
the first temperature sensor acquires, as the first temperature, a temperature of a portion indicating a largest temperature increase on a surface of the target device.

11. The temperature abnormality detection system according to claim 1, wherein
the board casing has a door that can be opened and closed, and
the target device is located apart from the door inside the board casing,
the temperature abnormality detection system further comprising a sensor substrate on which the first temperature sensor including the radiation temperature sensor and the second temperature sensor including a contact type temperature sensor for detecting the second temperature are mounted in common, wherein
the sensor substrate being mounted to an inner surface of the door in a tilted state so that the target device is in a field of view of the radiation temperature sensor.

* * * * *